(12) United States Patent
Taylor et al.

(10) Patent No.: US 9,578,850 B2
(45) Date of Patent: Feb. 28, 2017

(54) SCOOPING DEVICE

(71) Applicant: PROCESS4, INC., Chagrin Falls, OH (US)

(72) Inventors: Curtis Taylor, Chagrin Falls, OH (US); Matthew Hanson, Chagrin Falls, OH (US); David Hudak, Solon, OH (US)

(73) Assignee: Process4, Inc., Chagrin Falls, OH (US)

( * ) Notice: Subject to any disclaimer, the term of this patent is extended or adjusted under 35 U.S.C. 154(b) by 0 days.

(21) Appl. No.: 15/010,578

(22) Filed: Jan. 29, 2016

(65) Prior Publication Data

US 2016/0227727 A1 Aug. 11, 2016

Related U.S. Application Data

(60) Provisional application No. 62/112,944, filed on Feb. 6, 2015.

(51) Int. Cl.
| | |
|---|---|
| *A01K 29/00* | (2006.01) |
| *A01K 1/01* | (2006.01) |
| *B07B 1/02* | (2006.01) |
| *A01K 23/00* | (2006.01) |
| *E01H 1/12* | (2006.01) |
| *B65D 51/18* | (2006.01) |

(52) U.S. Cl.
CPC .......... *A01K 1/0114* (2013.01); *A01K 23/005* (2013.01); *B07B 1/02* (2013.01); *B65D 51/18* (2013.01); *E01H 1/1206* (2013.01); *B65D 2547/06* (2013.01)

(58) Field of Classification Search
CPC ... E01H 1/1206; A01K 1/0107; A01K 1/0114; A01K 23/005; B07B 1/02; B65D 51/18; B65D 2547/06
USPC ............................ 294/1.3, 1.4; 119/161, 867
IPC ........................................ B65D 51/18, 2547/06
See application file for complete search history.

(56) References Cited

U.S. PATENT DOCUMENTS

| | | | | |
|---|---|---|---|---|
| 3,738,697 | A * | 6/1973 | Kahan | B65D 75/22 294/1.4 |
| 8,152,657 | B2 * | 4/2012 | Green | A63B 47/02 294/19.2 |
| 2008/0042456 | A1 * | 2/2008 | Patel | E01H 1/1206 294/1.3 |
| 2008/0303295 | A1 * | 12/2008 | Moreno Fernandez De Betono | E01H 1/1206 294/1.3 |
| 2009/0278366 | A1 * | 11/2009 | Lipscomb | A01K 1/0114 294/1.4 |
| 2015/0042112 | A1 * | 2/2015 | Briski | E01H 1/1206 294/1.4 |

* cited by examiner

*Primary Examiner* — Stephen Vu
(74) *Attorney, Agent, or Firm* — Fay Sharpe LLP (57) ABSTRACT

A scooping device that can be used to grab pet refuse, urine clumps, etc. from a litter box, the ground, etc. or any other application where a scooping device is desirable. The scooping device can include a claw portion and a handle portion separated by a pole portion. The claw portion is moveable between an open position and a closed position and allows efficient sifting of grasped material contained within said claw portion.

26 Claims, 5 Drawing Sheets

SCOOPING DEVICE

CROSS-REFERENCE TO RELATED APPLICATIONS

This application claims priority to U.S. Provisional Patent Application Ser. No. 62/112,944, filed Feb. 6, 2015, which is incorporated by reference.

The present invention is directed to a scooping device, particularly to a handheld scooping device having a grasping feature, and more particularly to a handheld scooping device having a grasping and sifting feature, and even more particularly to a handheld scooping device having a grasping and sifting feature which may be used to clean a pet litter box and/or used to collect the refuse of an animal, and will be described with particular reference thereto. However, it is to be appreciated that the present exemplary embodiment is also amenable to other like applications.

BACKGROUND ON THE INVENTION

Significant improvements in cat litter now allow for clumping when the litter comes in contact with moisture, as found in cat urine and waste. The litter thus has an indicating feature and cat owners know that, when the cat litter is filled with clumps, it is time to change the litter or remove the waste material from the litter box. These refuse clumps are removed by lifting them out and disposing of them.

Despite advancements in cat litter, current techniques for removing the waste and urine clumps from the uncontaminated litter have proven difficult, inconvenient and/or ineffective. The present invention improves the separation process by providing a handheld scooping device that can have a sifting feature to separate used/contaminated cat litter from the unused/uncontaminated cat litter.

In addition to the contamination problem, prior art devices can be difficult and/or inconvenient to use. The present invention eliminates such difficulties and provides an easy and convenient way of disposing of the used/contaminated cat litter while keeping and reusing the unused/uncontaminated cat litter. Furthermore, the present invention lowers the cost associated with pet litter; removing and separating the contaminated litter from the uncontaminated litter reduces waste and increases the lifetime of the existing litter.

In view of the prior art, there remains a need for a scooping device that can provide an easy and convenient means of removing used/contaminated cat litter.

SUMMARY OF THE INVENTION

The present invention is directed to a handheld scooping device having a grasping and sifting feature, and more particularly to a handheld scooping device having a grasping and sifting feature which can be used to clean a pet litter box and/or used to collect the refuse of an animal and will be described with particular reference thereto. However, it is to be appreciated that the present invention can have other or additional applications. The scooping device of the present invention is useful for the removal of pet refuse, urine clumps, etc. from a litter box, the ground, etc. The scooping device of the present invention can be configured to be used while the user remains in a standing position and allows for easy collection and disposal of the pet refuse, urine clumps, etc.; however, this is not required. The scooping device of the present invention is configured to operably move between open and closed positions; however, this is not required.

In accordance with one non-limiting embodiment of the present invention, there is provided a scooping device suitable for use with the removal of pet refuse, urine clumps, etc. from a litter box. The scooping device can be designed to operably move between an open and closed position; however, this is not required. The scooping device is configured to provide a means of collection and manipulation of material from pet litter.

In accordance with another and/or alternative non-limiting embodiment of the present invention, there is provided a scooping device which can include a claw portion and a handle portion separated by a pole portion and an actuator mechanism operably connected to the claw mechanism. The material of the claw portion, handle portion and pole portion can be the same; however, this is not required. As can be appreciated, the material of at least one of the claw portion, handle portion, and the pole portion can be different from one or more other components of the scooping device. In one non-limiting embodiment, the material of the one or more components of the scooping device can be a high-density polyethylene (HDPE) plastic, a low-density polyethylene (LDPE) plastic, a rubber material, polyvinyl chloride (PVC), various types of resins, various types of resin epoxides, polyester, polypropylene, polyurethane, polyacrylate, and copolymers thereof, etc. As can be appreciated, one or more components of the scooping device of the present invention can be formed from other or additional materials (e.g., metal, wood, composite materials, ceramic, etc.).

In accordance with another and/or alternative non-limiting embodiment of the present invention, the scooping device includes a claw portion which can provide a means of grasping and manipulating pet refuse from pet litter. The claw portion of scooping device can comprise a first claw and a second claw; however, this is not required. In one non-limiting embodiment, the first and second claws can be moveable between an open and closed position; however, this is not required. The first and second claws can be substantially hemispherical in shape defining a cavity wherein pet refuse can be collected and retained; however, this is not required. In other or alternative non-limiting embodiments, the first and/or second claw can be a substantially flat, planar surface that can be circular, square, rectangular, etc. in shape; however, this is not required. When the claw portion includes first and second claws, each of the claws can be movable or only one claw can be movable when the claw portions moves between the open and closed position. In one non-limiting arrangement, the first and second claws when in the open position create a spacing from one another such that a material to be grasped can be partially or fully positioned between such material. When the first and second claws are moved to the closed position, the material to be grasped is partially or fully encircled by the first and second claws. The first and second claws are configured such that a cavity is formed by the first and second claws when in the closed position. The cavity is configured to hold the material that has been grasped by the claw portion. The shape and size of the first and second claw can be the same; however, this is not required.

In accordance with another and/or alternative non-limiting embodiment of the present invention, a flattened zone can be optionally provided on the claw for the purpose of providing a means of attachment to a moveable arm member. The one or more flattened zones can be marginally continuous and integrally formed with the claws; however, this is not required. As can be appreciated, a flattened zone is not required to connect the one or more claw portions to the movable arms.

In accordance with another and/or alternative non-limiting embodiment of the present invention, the shape of the first and/or second claws can optionally be hemispherical with a hollow core. The first and second claws are designed to grasp and retain pet refuse in the cavity formed by the first and second claws. In one non-limiting embodiment, the shape and dimensions of the first and second claws can optionally flex or otherwise conform at least partially to an object being grasped; however, this is not required. In one non-limiting embodiment, the first claw can have a diameter larger than the second claw; however, this is not required. In other or alternative non-limiting embodiments, the diameter of the first and second claws can be about equal. In another non-limiting configuration, the first and second claws have generally the same shape and size. The shape of the cavity formed by the first and second claws when in the closed position is non-limiting. In one non-limiting configuration, the shape of the cavity formed by the first and second claws when in the closed positions is generally spherical shaped. In another non-limiting configuration, the first and second claw form generally one half of the cavity when the first and second claws are in the closed position; however, this is not required. The dimensions of each claw portion can be adapted to the type of material and/or object to be grasped and/or manipulated. In some embodiments, the diameter of the first and second claws is within the range of about 0.25 in to about 8 in, and more particularly is within the range of about 0.5 in to about 6 in, and in one such embodiment, the diameter of the first and second claws is about 1 in to 4 in. In some embodiments, the thickness of the claws is within the range of about 1 mm to about 6 mm, and in one such embodiment, the thickness is about 1.5-4 mm. However, it can be appreciated that other diameter and thickness dimensions may be used for each of the claws.

In accordance with another and/or alternative non-limiting embodiment of the present invention, one or more openings or slots can be provided in the first and/or second claws of the scooping device that enable litter to pass through the openings or slots when the clumped pet refuse, urine clumps, etc. are removed from the litter box. This unique structure of the claws allows for the reduction of the waste of unused litter by sifting out contaminated/used litter and separating it from the uncontaminated/unused litter. The shape of the openings or slots in the first and second claws can be circular, elliptical, square, rectangular, trapezoidal, etc. As can be appreciated, other opening or slot shapes can be used. The size of the slots is selected so as to retrain most of the clumped pet litter within the cavity of the claws when the claws are in the closed position. Generally, the slots are configured so as to prevent clumps having a diameter of greater than about 1 inch from passing through the slots, or clumps having a width of greater than 1 inch from passing through the slots. As such, when the slots have generally circular shape, the diameter of the slots is less than 1 inch, typically less than 0.75 in, more typically less than 0.5 inch, and even more typically less than 0.25 inch. When the slot is generally square, the sides of the square slots are less than 1 inch, typically less than 0.75 in, more typically less than 0.5 inch, and even more typically less than 0.25 inch. When the slot is generally rectangular, the shorter side or width of the rectangular slot is less than 1 inch, typically less than 0.75 in, more typically less than 0.5 inch, and even more typically less than 0.25 inch. As can be appreciated, the one or most or slots in the one or more claws can have other shapes (e.g., oval, polygonal, semi-circular, etc.). The slots of the one or more of the claws can have the same shape and size; however, this is not required.

In accordance with another and/or alternative non-limiting embodiment of the present invention, a front edge or coupling edge can be configured on the first and second claws to engage with one another when the first and second claws are in the closed position. In one non-limiting arrangement, the first and second claws can have corresponding overlapping and underlapping flanges; however, other connection arrangements can be used. As such, the first and second claw portions can engage with one another to minimize or eliminate the amount of material leaking through the connection between the first and second claws when in a closed position.

In accordance with another and/or alternative non-limiting embodiment of the present invention, there is provided a retaining arrangement which can optionally include a biasing arrangement that is configured to bias the first and second claws in the open position; however, this is not required. One non-limiting biasing arrangement includes a cable or rod, a flange mechanism, and a spring; however, other or additional biasing arrangements can be used.

In accordance with another and/or alternative non-limiting embodiment of the present invention, a moveable arm portion can be connected at its distal end to the first or second claw. The proximal end of the moveable arm can be operably attached at a pivot point on an end pole flange. Such an arrangement can be used to allow the movement of the claw about the pivot point. When first and second moveable arm portions are connected at their distal end to the first or second claws, respectively, both of the claws can be caused to move by the moveable arms. As can be appreciated; other arrangements can be used. The claw portion can optionally be rotated around the pole portion such that objects can be picked up and manipulated at all angles; however, this is not required.

In accordance with another and/or alternative non-limiting embodiment of the present invention, the end pole flange can be configured to be optionally connected at its distal end to the first and second moveable arms, and at its proximal end to a pole portion and ultimately a handle portion which can be grasped by a user.

In accordance with another and/or alternative non-limiting embodiment of the present invention, the shape of the pole portion can be cylindrical with each end open; however, this is not required. As can be appreciated, the pole portion can comprise other or alternative cross-sectional shapes (e.g., square, rectangular, trapezoidal, etc.). In some embodiments, the diameter of the pole is within the range of about 0.25 in to about 2 in, and more particularly is within the range of about 0.5 in to about 1.5 in, and in one such embodiment, the diameter of the pole portion is about 1.0 in. In some embodiments, the thickness of the pole material is within the range of about 1 mm to about 2 mm, and in one such embodiment, the thickness of is about 1.5 mm. However, it can be appreciated that other diameter and thickness dimensions may be used. The pole portion generally has a length of about 1-6 ft, and generally 1.5-4 ft; however, other lengths can be used.

In accordance with another and/or alternative non-limiting embodiment of the present invention, the pole portion can house an actuator mechanism provided therein which is designed to cause the first and second claws to move between the open position and the closed position. The actuator mechanism can include a cable or rod pull system; however, this is not required. In another and/or alternative non-limiting embodiment, the actuator mechanism can include a spring-loaded cable or rod pull system; however, this is not required. The main body of the cable or rod can traverse the interior of the pole portion and connect at its proximal end to a handle portion where the cable or rod connects to a pivot point in the handle portion; however, this is not required. The type of pivot point is non-limiting. One such pivot point is a roller pivot point with a track for guiding the cable. The distal end of the cable or rod can be connected to a flange, thereby attached to the moveable arms; however, this is not required. As such, when the handle is moved to cause the claws to move to the closed position (e.g., the handle is compressed (i.e., squeezed), etc.), the cable or rod is caused to move toward to the top of pole (e.g., cable is stretched and pulled around the handle pivot point, etc.) thereby causing the moveable arms to move and cause the first and second claws to move to the closed position. In another and/or alternative non-limiting embodiment, the actuator mechanism can be connected to only one claw, thus one claw remains stationary as another is actuated and moved according to the movement of the handle portion; however, this is not required.

In accordance with another and/or alternative non-limiting embodiment of the present invention, there is provided a handle portion connected to the pole portion which can include a lever, button, etc. to enable the user to move the claws between the open and closed position. The handle portion can be designed to be grasped by the hand of a user; however, this is not required. The handle portion can include a hanging feature for the purpose of allowing the scooping device to be hung from a hook or to be attached to a wrist strap; however, this is not required. In one non-limiting embodiment, the handle portion optionally includes a surface projection providing a pivot point around which the handle can rotate; however, this is not required. As such, when the handle is compressed, the handle can be freely rotated around the pivot point such that the handle approaches and optionally contacts the underlying pole portion; however, this is not required.

In accordance with another and/or alternative non-limiting embodiment of the present invention, the handle can include a ridge for the purpose of improving grip to the handle and preventing the user's hand from sliding off the handle; however, this is not required. Optionally, the handle can be textured with a plurality of slip-resistant surface projections for the purpose of improving grip when wet. The textured pattern on the outer surface of the handle is non-limiting.

A method of using the scooping device can comprise the following steps: situating the open-biased claws around the section of cat litter to be sifted, squeezing the handle causing the first and second claws to approach each other, thereby contacting each other and securing the pet refuse inside the now provided grasping cavity created by the first and second claws; moving the closed scooping device over a garbage receptacle; and, releasing the handle so as to cause the first and second claws to move to the open position and allow the grasped materials to be disposed of in the garbage receptacle. However, as can be appreciated, other or additional steps may be used. When the first and/or second claws include one or more slots, after the first and second claws are moved to the closed position, the scooping device can be shaken to cause unused litter to pass through the slots and back into the litter box prior to the scooping device being moved to the garbage receptacle.

These and other objects, features, and advantages of the present invention will become apparent from the subsequent description taken in conjunction with the accompanying drawings.

BRIEF DESCRIPTION OF THE DRAWINGS

Reference may now be made to the drawings, which illustrate various non-limiting embodiments that the invention may take in physical form and in certain parts and arrangements of parts wherein.

DETAILED DESCRIPTION OF A
NON-LIMITING EMBODIMENT

Referring now to the drawings which illustrate one non-limiting embodiment of a scooping device 10 in accordance with the present invention that is suitable for use in the collection and/or removal of pet refuse from a litter box. Although the scooping device of the present invention described herein is illustrated in an exemplary embodiment as being associated with the collection and/or removal of pet refuse from a litter box, the scooping device can also be used for the grasping, collection and/or removal of many additional or other objects (e.g., rocks, charcoal briquettes, etc.).

Figure 1:
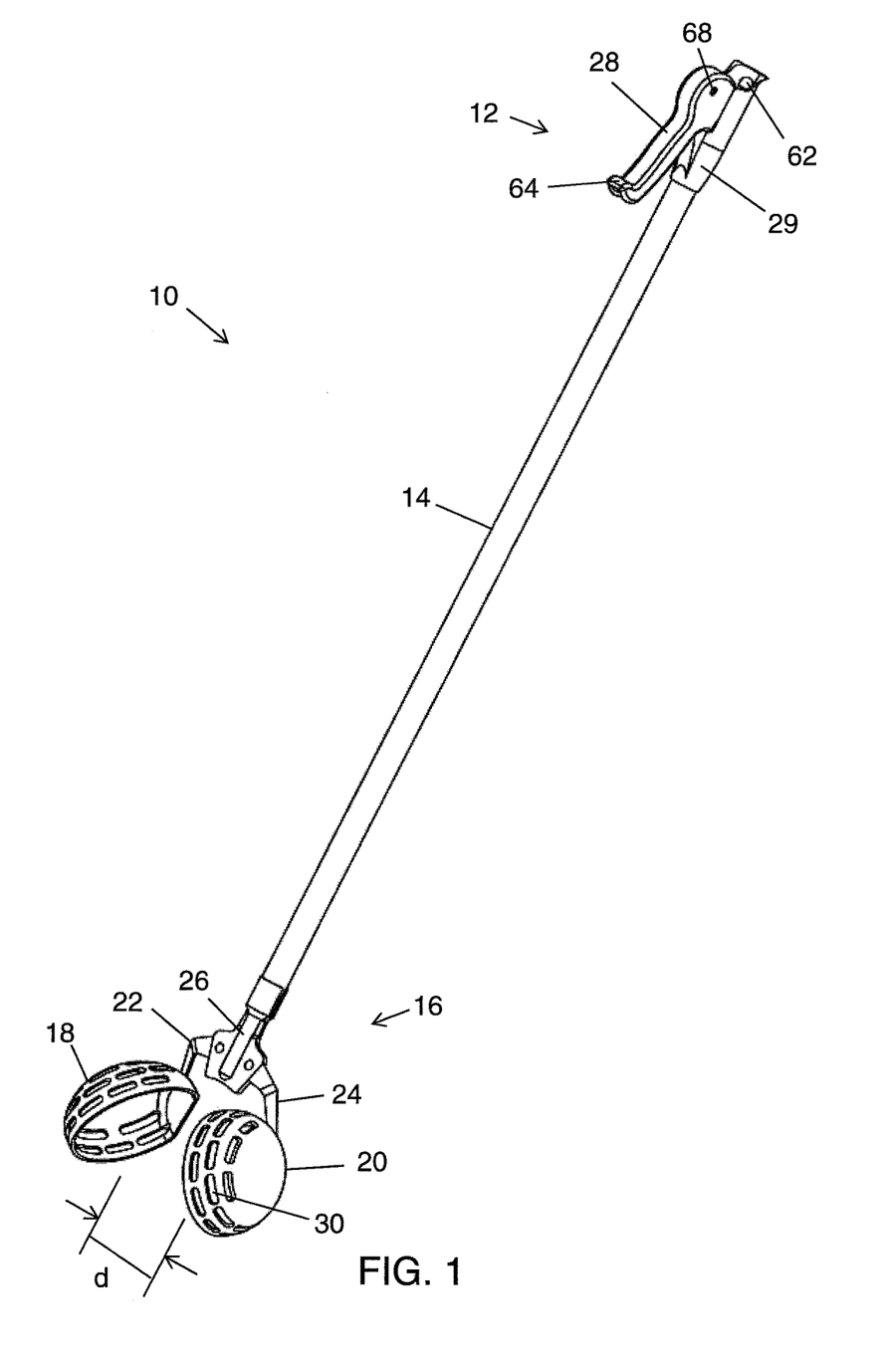
FIG. 1 is a front perspective illustration of the scooping device in an open position according to one non-limiting aspect of the present invention.

Referring now to FIG. 1, the scooping device 10 optionally comprises a handle portion 12 and a claw portion 16 separated by a pole portion 14; however, this is not required. Claw portion 12 can include a first claw 18 and a second claw 20; however, this is not required. First claw 18 and second claw 20 can be connected to end pole flange 26 by moveable arm 22 and moveable arm 24, respectively; however, this is not required. The shape, size and materials of the claw portion, the handle portion, and the pole portions are non-limiting.

End pole flange 26 can be designed to connect pole portion 14 to claw portion 16 and provide a means of attaching an actuating mechanism to the first and second claws; however, this is not required. End pole flange 26 optionally provides one or more pivot points 100 and 102; however, this is not required. Pivot points 100 and 102 can be provided for the purpose of directing the movement of claw 18 and claw 20, respectively; however, this is not required. The shape and dimensions of end pole flange 26 are non-limiting.

Handle portion 12 can optionally be connected to pole section 14 for the purpose of holding and/or using scooping device 10; however, this is not required. Handle portion 12 can provide a handle 28 which can be grasped by a user; however, this is not required. Handle portion 12 includes a base portion 29 that is designed to be connected to the top end of the pole portion 14. The lower portion of the base portion can include a cavity (not shown) that can be designed to telescopically receive a portion of the top end of the pole portion; however, this is not required. In such an arrangement, a friction fit can be used to secure the base portion to the pole portion; however, other or additional arrangements can be used (e.g., adhesive, screw, rivet, threaded connection, snap lock connection, etc.). As can be appreciated, other configurations of the base portion can be used to enable the base portion to be secured to the pole portion. The handle 28 is designed to be moveably connected to the base portion. Such a connection can be a pivot connection, a sliding connection, a twist connection, etc. As illustrated in FIG. 1, the handle 28 is pivotally connected to the base portion. The handle 28 is used for the purpose of controlling the actuating mechanism of scooping device 10; however, this is not required. As such, handle 28 can be designed to cause the first and second claws to move between open and closed positions to facilitate the grasping and sifting or otherwise manipulating material grasped from the cat litter box.

Figure 3:
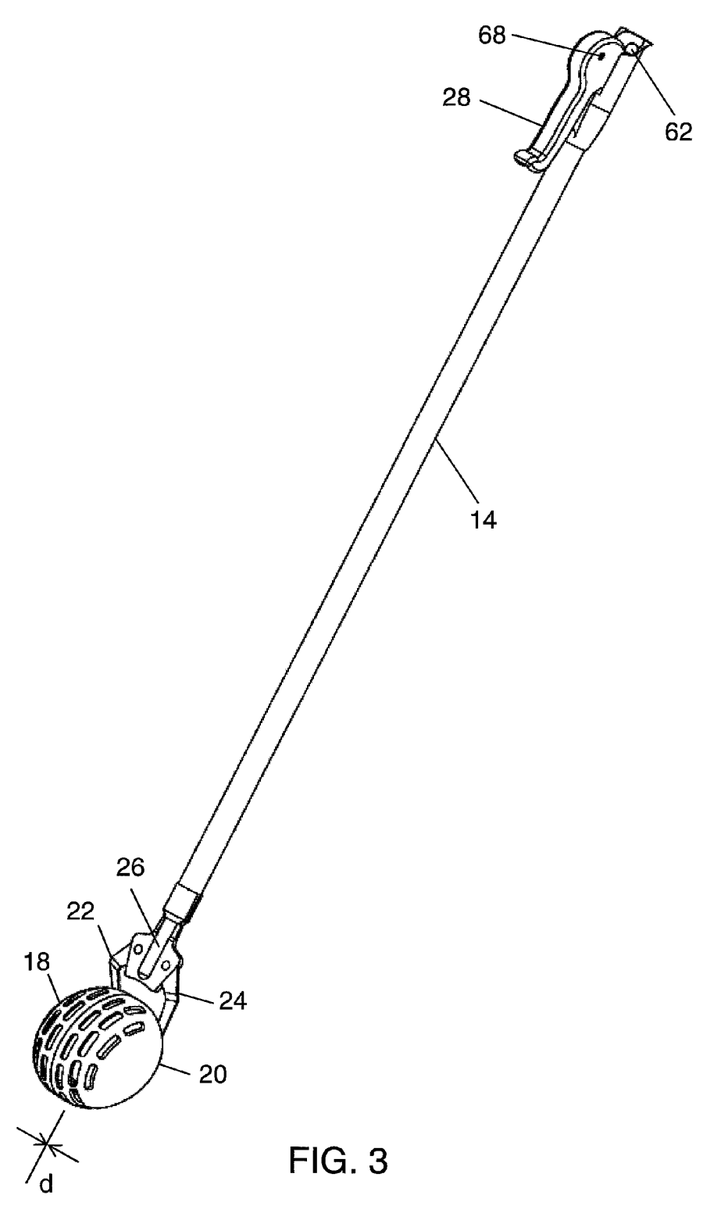
FIG. 3 is a front perspective illustration of the scooping device in a closed position.
Figure 5:
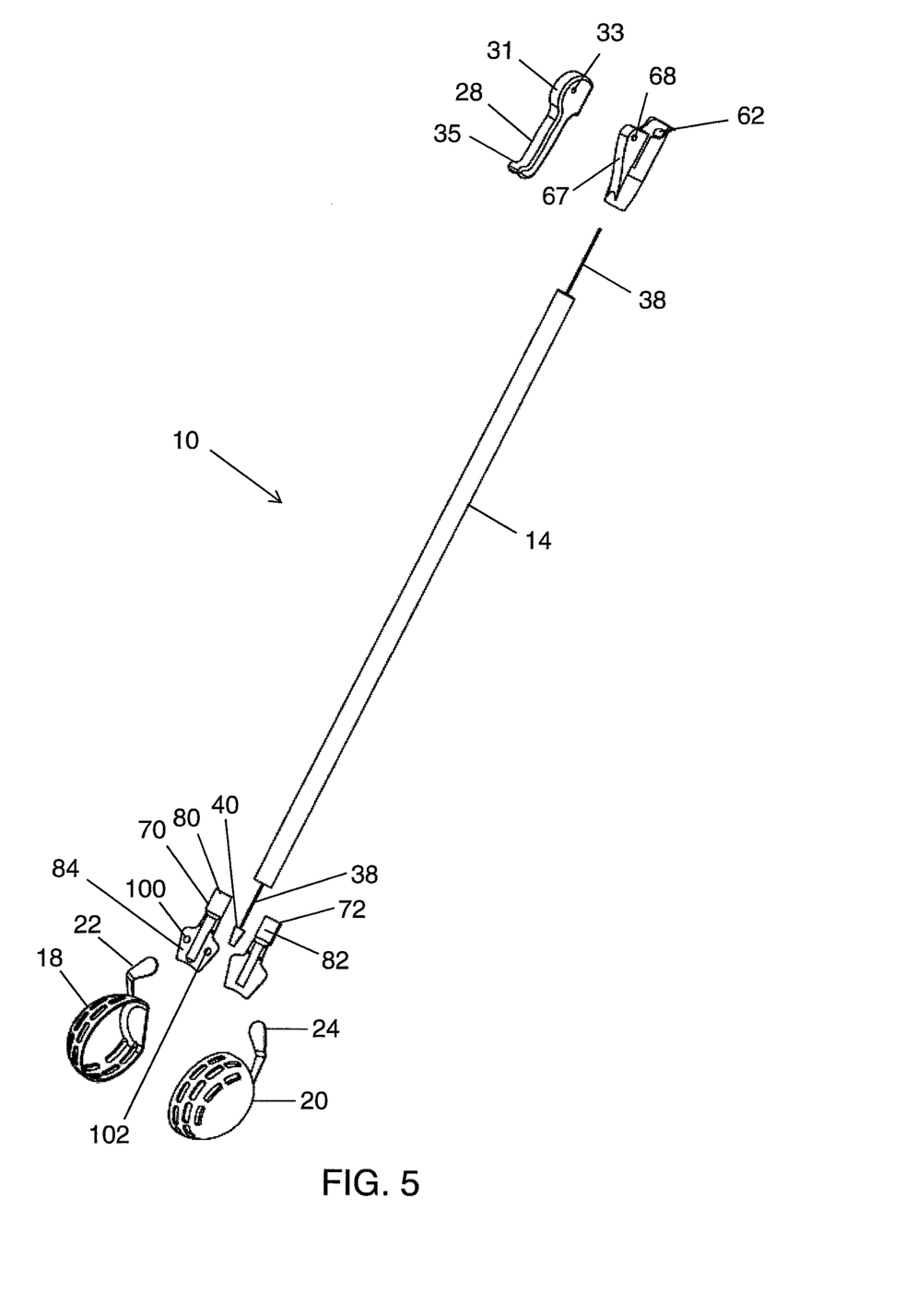

Referring now to FIGS. 1, 3 and 5, the handle portion 12 includes an upper portion 31 that is configured to be pivotally connected to connection member 67 on the base portion 29 of the handle portion. Connection member 67 includes a connection opening 68 that functions as a pivot point for the handle 28 relative to the base portion 29. The upper portion 31 also includes an opening 33 that is designed to align with the connection opening 68 when the handle is positioned on the base portion. A pin or other type of connection arrangement can be used to pivotally secure the handle 28 to the base portion via opening 33 and connection opening 68.

Handle 28 includes a lower portion 35 that can be grasped by a user. As illustrated in FIGS. 1, 3 and 5, the lower portion extends downwardly from the top end of the pole portion when the handle portion is connected to the pole portion. Such a configuration enables a user to grasp both the base portion and lower portion of the handle when using the scooping device. As will be described in detail below, a user can merely squeeze the handle toward the pole portion with a single hand to cause the first and second claws to move to the closed position and release the handle to cause the handle to move away from the pole portion to cause the first and second claws to move to the open position.

In another non-limiting embodiment, the lower portion 35 of handle 28 can include a hook feature 64 for the purpose of improving grip to the handle and thereby inhibiting or preventing a user's hand from sliding off the handle 28; however, this is not required.

In non-limiting embodiments, handle portion 12 includes a hanging feature 62 for the purpose of allowing the scooping device to be hung from a hook or to be attached to a tether or wrist strap; however, this is not required. The hanging feature can be in the form of an opening; however, this is not required.

With continued reference to FIG. 1, the claw portion 16 can be biased in an open position, that is, a distance d exists between claw 18 and claw 20 when the handle 28 is not actuated (e.g., pivotally moving the handle toward the pole portion, etc.); however, this is not required. As can be appreciated, claw portion 16 can be biased in a closed or partially closed position.

As illustrated in FIGS. 1-5, the claw portion 16 optionally has a substantially hemispherical shape when the first and second claws are in the closed position; however, this is not required. Each of the first and second claws 18, 20 are illustrated as having the same shape and size; however, this is not required. Each claw portion has a generally semispherical shape; however, this is not required. The front edge or coupling edges 32 and 34 on claws 18 and 20 are configured to face one another and optionally contact one another when the claws are moved to the closed position.

The material of claw portion 16 can be polyethylene; however, this is not required. As can be appreciated, the claw portion 16 can be formed of other or alternative materials.

In one non-limiting embodiment, the dimensions of the first and second claws portion are about 1-3 in depth and 2-4 in diameter. However, it can be appreciated that each of the claws can have many other types of shapes and dimensions. In non-limiting embodiments, the coupling edges 32 and 34 of claws 18 and 20 can include overlapping and underlapping flanges (not shown) for the purpose of overlapping one another when the claws are in the closed position; however, this is not required. The thickness of the material of claws 18 and 20 can be about 1-25 mm; however, this is not required.

One or both of first and second claws 18, 20 can optionally include one or more openings or slots 30 through which material can flow. Openings or slots 30 can be provided for the purpose of enabling uncontaminated or unclumped litter to pass through the openings or slots when the pet refuse, urine clumps, etc. are removed from the litter box; however, this is not required. The unique structure of the claws 18 and 20 allow for a reduction of the waste of unused/uncontaminated litter. As such, the litter in a litter box can be sifted so as to remove the contaminated litter. In one non-limiting embodiment, three rows of slots 30 are provided substantially parallel to the coupling edges in a position equidistant from one another, and extend at least partially the circumference of the claw 18 and 20; however, it can be appreciated that other distances can be used in embodiments. In one non-limiting arrangement, the cross-sectional area of slot 30 comprises an elliptical shape; however, it can be appreciated that other distances and shapes can be used in embodiments. The number of openings and the size and shape of the openings on each of the claws is non-limiting. Generally, the shape of the openings on each claw or both claws is the same; however, this is not required. The size of each of the openings on each or both claws is generally the same; however, this is not require. Generally, the number of openings on two or more of the rows of slots on each or both claws is different; however, this is not required.

Optionally disposed on one side of each of the first and second claws 18 and 20 is a flattened zone 36 that can be optionally used for connecting to moveable arms 22 and 24; however, this is not required. As can be appreciated, the claws can be absent a flattened zone and the moveable arms can be connected to a non-flattened region on one or both claws. The shape and dimension of the flattened zone (when used) are non-limiting. In non-limiting embodiments, the cross-sectional shape of flattened zone 36 is semicircular and comprises a substantially flat, planar surface; however, this is not required. In other non-limiting embodiments, the coupling edge of flattened zone 36 is continuous with the coupling edges of claws 18 and 20; however, this is not required. Flattened zone 36 on each claw (when used) can be designed to engage with moveable arms 22 and 24.

Moveable arm 22 and 24 of scooping device 10 can be continuous with claw 18 and 20, respectively; however, this is not required. As can be appreciated, the moveable arms and the claws can be two distinct components of the scooping device. The moveable arms can be designed to be detachable from the claws; however, this is not required. As illustrated in FIGS. 1-5, the bottom portion of the moveable arms is connected to the first and second claws.

Figure 2:
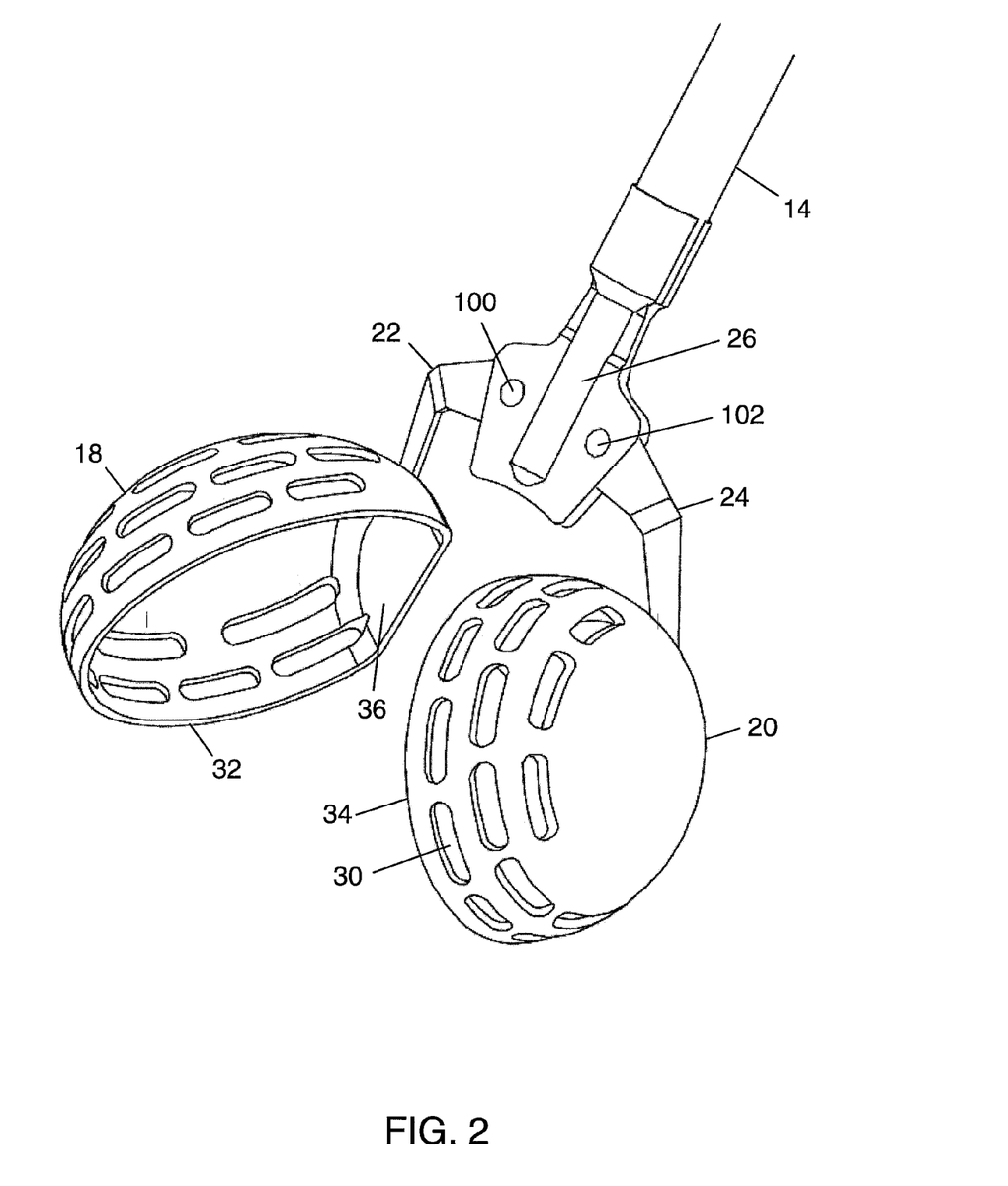
FIG. 2 is an enlarged front perspective illustration of the claw head portion of the scooping device of FIG. 1 in an open position.
Figure 4:
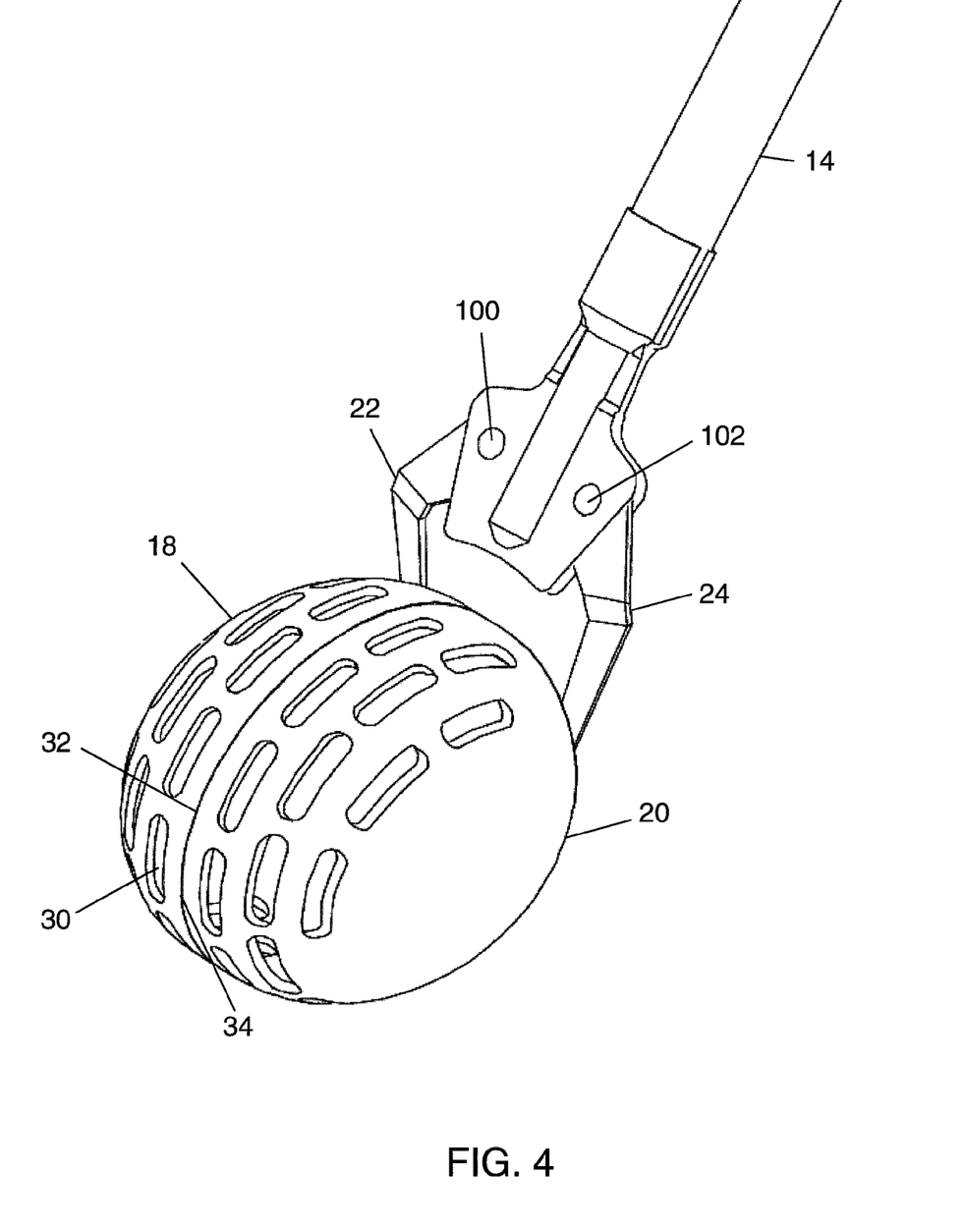
FIG. 4 is an enlarged front perspective illustration of the claw head portion of the scooping device of FIG. 3 in the closed position; and, FIG. 5 is an exploded view of the scooping device of FIG. 1.

Referring now to FIGS. 1-5, at least a portion of arm members 22 and 24 of the claw portion extends inwards into and between the first flange 70 and second flange 72 of end pole flange 26. The first and second flanges have generally the same shape; however, this is not required. The top portions 80, 82 of the first and second flanges is configured to connect to the bottom portion of the pole portion. Such a connection arrangement is non-limiting (e.g., adhesive, friction fit, rivet, screw, snap-fit, etc.). The base portion 84 of the first flange includes openings 100, 102 that are used to pivotally connect the top section of moveable arms 22, 24 to the base portion of the flanges. As can be appreciated, the moveable arms can be connected to the second flange 72 or to both the first and second flanges. The base portion of the first and second flanges have generally the same shape; however, this is not required. As best illustrated in FIGS. 2 and 4, the top portion of the moveable arms 22, 24 is positioned between the first and second flanges when the scooping device is fully assembled; however, this is not required. As illustrated in FIG. 5, the base portion of the first and second flanges is generally the same; however, this is not required.

As illustrated in FIG. 5, a cable or rod 38 is movable positioned in an internally passageway of the pole portion along the longitudinal length of the pole portion. Generally, the pole portion is a hollow tube that has an internal passageway that extends the full longitudinal length of the pole portion; however, this is not required. The cable or rod can be rigid or flexible. One end of the cable or rod is connected to the upper portion 31 of the handle. The type of connection is non-limiting. The end of the rod or cable is connected to a cable flange 40. The cable flange has a generally trapezoidal shape wherein the longer parallel side is positioned closer to the end of the pole portion; however, it can be appreciated that the cable flange can have other shapes. The trapezoidal shape prevents the other sides of the cable flange from engaging the moveable arms when the moveable arms move between the open and closed positions. When the scooping device is fully assembled, the cable flange is positioned between first flange 70 and second flange 72 of end pole flange 26, and also position below the connection location of the moveable arms 22, 24 to the end pole flange 26; however, this is not required. The cable flange is designed to be movable between first and second flanges 70, 72. When the cable flange is caused to be retracted toward the end of the pole portion, the top of the cable flange is designed to engage the lower region of the top section of the movable arms to cause the moveable arms to pivot about openings 100, 102 and thereby cause the first and second claws to move toward one another to the closed position. The lower region of the top section of the movable arms can optionally have a curved surface that is engaged by the cable flange that facilitates in the pivoting movement of the moveable arms; however, this is not required. When the cable flange moves away or recedes from the end of the pole portion, the cable flange also recedes from openings 100, 102 and allows the moveable arms to pivot about openings 100, 102 to allow the claws to move to the open position. A biasing arrangement (not shown) can be used to bias the claws in the open position; however, this is not required. One non-limiting biasing arrangement is a spring system. The spring system can be designed to interact with the moveable arms to bias the position of the moveable arms in a position that causes the claws to be biased in the open position (e.g., spring positioned between the moveable arms, etc.). As can be appreciated, other biasing arrangements can be used. As can also be appreciated, the handle on the handle portion can also or alternatively be biased in a position wherein the handle is positioned in a position that corresponds to the open position of the claws (e.g., handle biased to pivotally move away from the pole portion, etc.).

A general method for using the scooping device 10 of the present invention can be performed by the following steps: 1) grasping the handle portion 12 of the scooping device 10; 2) squeezing the handle 28 so as to draw the handle 28 towards pole portion 14 as illustrated in FIG. 3 wherein handle 28 rotates around connection opening 68, which causes claws 18, 20 to move to the closed position as illustrated in FIGS. 3 and 4; and, 3) releasing handle 28 such that the handle pivots away from the pole portion and cause cable or rod 38 to extend back to its original position thereby causing the claws to move to the open position as illustrated in FIGS. 1 and 2.

Referring now to FIG. 3, handle 28 can be compressed (i.e., grasped or squeezed by the user) thereby moving the claws 18 and 20 into a closed position. The closed position is defined as when the distance d is or approaches zero. When handle 28 is released (i.e., no longer being compressed by the user), distance d between claws 18 and 20 can return to its original distance and thus the open position.

As illustrated in FIG. 4, the first claw 18 and the second claw 20 can come together and engage with each other thereby defining a closed-off cavity between the claws 18 and 20. In a fully closed position, edge 32 of claw 18 and edge 34 of claw 20 can meet and engage with each other over substantially their entire coupling edges; however, this is not required.

In use, when the claws are in the closed position and one or more clumps of pet litter are positioned in the cavity between the first and second claws, a user can optionally slightly shake the scooping device to cause unclumped litter to escape through the one or more slots 30 in the first and second claws to return to the litter box; however, this is not required.

The invention has been described with reference to a number of different embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

The invention claimed is:

1. A method for collecting and disposing of clumped litter in a litter box comprising:
    (a) providing a scooping device, said scooping device including:
        a claw portion comprising a first claw and a second claw, said first and second claws moveable between an open position and a closed position, said first and second claws positioned farther from one another in said open position as compared to said closed position, each of said first and second claws having a side wall, said first claw including a plurality of slots in said side wall, said plurality of slots spaced from a peripheral edge of said first claw, said second claw including a plurality of slots in said side wall, said plurality of slots spaced from a peripheral edge of said second claw;
        a handle portion including a moveable handle that is moveable between a first and a second position;

a pole portion separating said claw portion and said handle portion, said handle portion connected to a top portion of said pole portion, said claw portion positioned on or below a bottom portion of said pole portion; and an actuator interacting with said claw portion to cause said first and second claws to move between said open and closed positions, said movable handle in said second position causing said first and second claws to move to said closed position;

(b) positioning said scooping device in the litter box such that clumped litter is positioned between said first and second claws while said first and second claws are in said open position;

(c) moving said movable handle from said first position to said second position to cause said first and second claws to move to said closed position and to cause the clumped litter to be entrapped in a cavity formed by said first and second claws in said closed position;

(d) shaking said scooping device after said first and second claws are moved to said closed position and prior to moving said scooping device from said litter box, said step of shaking causing unclumped litter entrapped in said cavity formed by said first and second claws in said closed position to pass through said at least one of said plurality of slots in at least one of said first and second claws and into said litter box;

(e) moving said scooping device from said litter box to a disposal receptacle while maintaining said first and second claws in the closed position; and, (f) moving said movable handle from said second position to said first position to cause said first and second claws to move to said open position to thereby cause said entrapped clumped litter to exit said claw portion and be positioned in said disposal receptacle.

2. The method as defined in claim 1, wherein said claw portion includes a first moveable arm connected at an outer surface of one end to said first claw and the opposite end engaging said actuator, and a second first moveable arm connected at an outer surface of one end to said second claw and the opposite end engaging said actuator.

3. The method as defined in claim 2, including an end pole flange connected to said bottom portion of said pole portion, said first and second movable arms pivotally connected to said end pole flange.

4. The method as defined in claim 3, wherein the first and second claws are substantially hemispherical in shape.

5. The method as defined in claim 4, including a biasing arrangement that causes said first and second claws to be biased in said open position.

6. The method as defined in claim 5, wherein said actuator includes a rod or cord connected at one end to said handle and at an opposite end to a cable flange, said cable flange engaging said claw portion.

7. The method as defined in claim 6, wherein said movable handle is positioned closer to said pole portion when said movable handle is in said second position than when said movable handle is in said first position, said second position of said movable handle corresponding to said closed position of said first and second claws, said first position of said movable handle corresponding to said open position of said first and second claws.

8. The method as defined in claim 7, wherein said movable handle includes a curved hook portion at a lower end of said movable handle, a gripping arrangement, or combinations thereof.

9. The method as defined in claim 8, wherein said side wall of said first claw includes a plurality of rows of said slots, and said side wall of said second claw includes a plurality of rows of said slots.

10. The method as defined in claim 9, wherein said movable handle is oriented such that a longitudinal axis of said moveable handle moves closer to being parallel with a longitudinal axis of said pole portion when in said second position than when in said first position, said movable handle extends downwardly from a top end of said pole portion, said movable handle configured to enable a user to grasp both said movable handle and said pole portion with a single hand when said user causes said movable handle to move between said first and second positions.

11. The method as defined in claim 1, wherein the first and second claws are substantially hemispherical in shape.

12. The method as defined in claim 1, including a biasing arrangement that causes said first and second claws to be biased in said open position.

13. The method as defined in claim 1, wherein said actuator includes a rod or cord connected at one end to said handle and at an opposite end to a cable flange, said cable flange engaging said claw portion.

14. The method as defined in claim 1, wherein said movable handle is positioned closer to said pole portion when said movable handle is in said second position than when said movable handle is in said first position, said second position of said movable handle corresponding to said closed position of said first and second claws, said first position of said movable handle corresponding to said open position of said first and second claws.

15. The method as defined in claim 14, wherein said movable handle is oriented such that a longitudinal axis of said moveable handle moves closer to being parallel with a longitudinal axis of said pole portion when in said second position than when in said first position, said movable handle extends downwardly from a top end of said pole portion, said movable handle configured to enable a user to grasp both said movable handle and said pole portion with a single hand when said user causes said movable handle to move between said first and second positions.

16. The method as defined in claim 1, wherein said movable handle includes a curved hook portion at a lower end of said movable handle, a gripping arrangement, or combinations thereof.

17. The method as defined in claim 1, wherein said side wall of said first claw includes a plurality of rows of said slots, and said side wall of said second claw includes a plurality of rows of said slots.

18. A method for collecting and disposing of clumped litter in a litter box comprising:

(a) providing a scooping device, said scooping device including:
  a claw portion comprising a first claw and a second claw, said first and second claws moveable between an open position and a closed position, said first and second claws positioned farther from one another in said open position as compared to said closed position;
  a pole portion;
  a handle portion including a moveable handle that is moveable between a first and a second position, a pole portion separating said claw portion and said handle portion, said handle portion connected to a top portion of said pole portion, said claw portion positioned on or below a bottom portion of said pole portion, said movable handle is positioned closer to said pole portion when said movable handle is in said second position than when said movable handle is in said first position, said second position of said movable handle corresponding to said closed position of said first and second claws, said first position of said movable handle corresponding to said open position of said first and second claws, said movable handle is oriented such that a longitudinal axis of said moveable handle moves closer to being parallel with a longitudinal axis of said pole portion when in said second position than when in said first position, said movable handle extends downwardly from a top end of said pole portion, said movable handle configured to enable a user to grasp both said movable handle and said pole portion with a single hand when said user causes said movable handle to move between said first and second positions; and, an actuator interacting with said claw portion to cause said first and second claws to move between said open and closed positions, said movable handle in said second position causing said first and second claws to move to said closed position, (b) positioning said scooping device in the litter box such that clumped litter is positioned between said first and second claws while said first and second claws are in said open position;

(c) moving said movable handle from said first position to said second position to cause said first and second claws to move to said closed position and to cause the clumped litter to be entrapped in a cavity formed by said first and second claws in said closed position;

(d) moving said scooping device from said litter box to a disposal receptacle while maintaining said first and second claws in the closed position; and, (e) moving said movable handle from said second position to said first position to cause said first and second claws to move to said open position to thereby cause said entrapped clumped litter to exit said claw portion and be deposited in said disposal receptacle.

19. The method as defined in claim 18, wherein each of said first and second claws has a side wall, said first claw including a plurality of slots in said side wall, said plurality of slots spaced from a peripheral edge of said first claw, said second claw including a plurality of slots in said side wall, said plurality of slots spaced from a peripheral edge of said second claw, and including the further step of shaking said scooping device after said first and second claws are moved to said closed position and prior to moving said scooping device from said litter box, said step of shaking causing unclumped litter entrapped in said cavity formed by said first and second claws in said closed position to pass through said at least one of said plurality of slots in at least one of said first and second claws.

20. The method as defined in claim 19, wherein said side wall of said first claw includes a plurality of rows of said slots, and said side wall of said second claw includes a plurality of rows of said slots.

21. The method as defined in claim 20, wherein said claw portion includes a first moveable arm connected at an outer surface of one end to said first claw and the opposite end engaging said actuator, and a second first moveable arm connected at an outer surface of one end to said second claw and the opposite end engaging said actuator, said first and second movable arms pivotally connected to an end pole flange that is connected to said bottom portion of said pole portion, said first and second claws are substantially hemispherical in shape.

22. The method as defined in claim 21, including a biasing arrangement that causes said first and second claws to be biased in said open position.

23. The method as defined in claim 22, wherein said movable handle includes a curved hook portion at a lower end of said movable handle, a gripping arrangement, or combinations thereof.

24. The method as defined in claim 18, wherein said claw portion includes a first moveable arm connected at an outer surface of one end to said first claw and the opposite end engaging said actuator, and a second first moveable arm connected at an outer surface of one end to said second claw and the opposite end engaging said actuator, said first and second movable arms pivotally connected to an end pole flange that is connected to said bottom portion of said pole portion, said first and second claws are substantially hemispherical in shape.

25. The method as defined in claim 18, including a biasing arrangement that causes said first and second claws to be biased in said open position.

26. The method as defined in claim 18, wherein said movable handle includes a curved hook portion at a lower end of said movable handle, a gripping arrangement, or combinations thereof.

* * * * *